United States Patent
Baca et al.

(10) Patent No.: US 9,546,870 B2
(45) Date of Patent: Jan. 17, 2017

(54) DYNAMIC ROUTE MAPPING BETWEEN MOBILE DEVICES

(75) Inventors: Jim S. Baca, Corrales, NM (US); David Stanasolovich, Albuquerque, NM (US); Mark H. Price, Placitas, NM (US); Burges M. Karkaria, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/997,442

(22) PCT Filed: Apr. 18, 2012

(86) PCT No.: PCT/US2012/034068
§ 371 (c)(1),
(2), (4) Date: Apr. 15, 2014

(87) PCT Pub. No.: WO2013/158091
PCT Pub. Date: Oct. 24, 2013

(65) Prior Publication Data
US 2014/0222328 A1    Aug. 7, 2014

(51) Int. Cl.
*G01C 21/00* (2006.01)
*G01C 21/20* (2006.01)
(Continued)

(52) U.S. Cl.
CPC ........... *G01C 21/00* (2013.01); *G01C 21/3438* (2013.01); *G01C 21/3676* (2013.01); *H04W 4/02* (2013.01); *H04W 4/023* (2013.01); *H04W 4/008* (2013.01)

(58) Field of Classification Search
CPC .............................. G01C 21/20; G01C 21/3438
See application file for complete search history.

(56) References Cited

U.S. PATENT DOCUMENTS 6,937,869 B1   8/2005   Rayburn
6,993,350 B2   1/2006   Katoh
(Continued)

FOREIGN PATENT DOCUMENTS

WO   2013/158091 A1   10/2013

OTHER PUBLICATIONS

International Preliminary Report on Patentability and Written Opinion received for PCT Patent Application No. PCT/US2012/034068, mailed on Oct. 30, 2014, 7 pages.
(Continued)

*Primary Examiner* — Fadey Jabr
*Assistant Examiner* — Thomas Ingram
(74) *Attorney, Agent, or Firm* — Grossman, Tucker, Perreault & Pfleger, PLLC (57) ABSTRACT

Generally, this disclosure describes dynamic route mapping between mobile devices. Techniques may include initiating communication between a first mobile device at a first location and a second mobile device at a second location; receiving a first location indicator by the second mobile device, the first location indicator transmitted from the first mobile device in response to a request from the second mobile device, the first location indicator corresponding to the first location; determining a convergence point based on at least one of the first location and the second location; mapping a travel route from at least one of the first location and the second location to the convergence point; and displaying the travel route on at least one of the first mobile device and the second mobile device.

18 Claims, 4 Drawing Sheets

(51) Int. Cl.
*G01C 21/34* (2006.01)
*H04W 4/02* (2009.01)
*H04W 4/00* (2009.01)
*G01C 21/36* (2006.01)

(56) References Cited

U.S. PATENT DOCUMENTS

| | | | |
|---|---|---|---|
| 8,174,381 B2* | 5/2012 | Imes et al. | 340/539.23 |
| 2006/0155460 A1* | 7/2006 | Raney | 701/207 |
| 2008/0231507 A1* | 9/2008 | Burckart et al. | 342/357.08 |
| 2009/0005018 A1* | 1/2009 | Forstall et al. | 455/414.1 |
| 2009/0017803 A1* | 1/2009 | Brillhart | G01C 21/20 455/414.2 |
| 2011/0028132 A1* | 2/2011 | Bos | 455/414.2 |
| 2011/0066468 A1* | 3/2011 | Huang et al. | 705/9 |
| 2011/0113148 A1* | 5/2011 | Salmela | G01C 21/3438 709/229 |
| 2013/0172016 A1* | 7/2013 | Ooka | 455/456.3 |
| 2014/0278668 A1* | 9/2014 | Paradise et al. | 705/7.19 |
| 2014/0336931 A1* | 11/2014 | Wilkins | 701/527 |

OTHER PUBLICATIONS

International Search Report and Written Opinion received for PCT Application No. PCT/US2012/034068, mailed on Dec. 18, 2012, 10 pages.
European Search Report received for European Patent Application No. 12874664.1, mailed on Oct. 15, 2015, 7 pages.

* cited by examiner

DYNAMIC ROUTE MAPPING BETWEEN MOBILE DEVICES

FIELD

This disclosure relates to route mapping, more particularly dynamic route mapping between mobile devices.

BACKGROUND

Many mobile devices, e.g., smart phones, are capable of mapping travel routes in response to a request from a user of the mobile device and may be capable of displaying the user's location (i.e., the mobile device's location) on a displayed map that includes at least a portion of the travel route. A user may also opt-in to allowing the user's location to be displayed to selected other user(s) using, for example, a Locimobile® app or Google Latitude™, by including the selected other users in, e.g., a contact list, associated with the app. The user's location may then be displayed to the other users at intervals and/or in response to a "where is user" request from one or more of the other users.

BRIEF DESCRIPTION OF THE DRAWINGS

Features and advantages of embodiments of the claimed subject matter will become apparent as the following Detailed Description proceeds, and upon reference to the Drawings, wherein like numerals depict like parts, and in which:

Although the following Detailed Description will proceed with reference being made to illustrative embodiments, many alternatives, modifications, and variations thereof will be apparent to those skilled in the art.

DETAILED DESCRIPTION

Generally, this disclosure describes techniques for dynamic route mapping between mobile devices. A user of a first mobile device and a user of a second mobile device who are communicating via their respective mobile devices generally do not know the location of the other mobile device. If the users wish to meet, it may be difficult to determine a meeting location, especially if they are in an unfamiliar area. Services such as Locimobile® or Google Latitude™ may allow one user to determine a location of another user but these services are not tied to communication between mobile devices. A user may enable selected other users to have access to the location of the user's mobile device until the user changes settings. The selected other users may be included in the user's contact list associated with these services and the access is managed by the service.

A method and system are configured to allow mapping a route between at least two users of respective mobile devices while the users are communicating. Both the communication and the mapping may be conducted using the mobile devices. For example, a first user and associated first mobile device may be at a first location and a second user and associated second mobile device may be at a second location in, e.g., a city. Each user may not know the location of the other user but the users may wish to meet. The second user may initiate dynamic mapping on the second mobile device. The second mobile device may then transmit a request to the first mobile device for its location (i.e., the first location). If the first user opts in, the first mobile device may transmit a location indicator corresponding to the first location to the second mobile device. The second mobile device may then generate a map (i.e., map a travel route) from the second location to the first location. In this embodiment, the first user and first mobile device may not be moving. The second user may then follow the mapped route to the first user, meeting the first user at the first location. The first user may not know the location of the second user until they meet.

In another example, the first user may not remain stationary. In this example, in addition to the operations associated with the first example described above, the first mobile device may request the second location from the second mobile device. If the second user opt in, a location indicator corresponding to the second location may be transmitted to the first mobile device. At least one of the mobile devices may then determine a convergence point based on the first location and the second location. The convergence point corresponds to a target meeting location for the first user and the second user. For example, the convergence point may be half way between the first location and the second location. Travel routes may then be mapped from the first location and the second location to the convergence point. The users may then each follow their respective mapped routes to the convergence point. In an embodiment, the convergence point may be adjusted based on current locations of the mobile devices during travel (e.g., if one user is moving faster than the other).

Thus, a system and method consistent with at least one embodiment of the present disclosure are configured to allow two (or more) users who are communicating using mobile devices to map a route to a meeting location (i.e., convergence point). In the first example, only one user may be moving and the location of the moving user may not be known to the stationary user. In the second example, both users may be moving (i.e., travelling) toward the convergence point.

Figure 1:
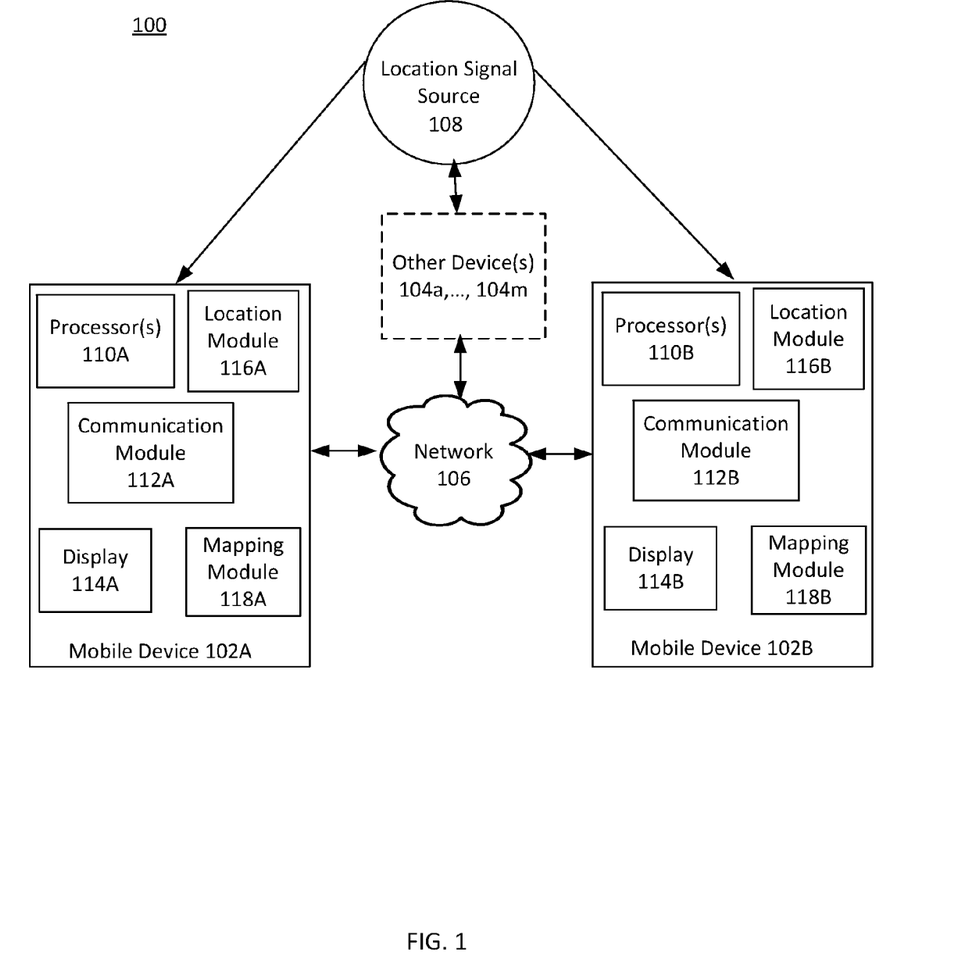
FIG. 1 illustrates a dynamic route mapping system consistent with various embodiments of the present disclosure.

FIG. 1 illustrates a dynamic route mapping system 100 consistent with various embodiments of the present disclosure. The system 100 generally includes a first mobile device 102A and a second mobile device 102B, a network 106 and a location signal source 108. Each mobile device 102A, 102B is configured to determine its location (and thereby the location of the associated user) based on a location signal from location signal source 108.

It should be noted that a dynamic routing system consistent with the present disclosure may include more than two mobile devices. Thus, system 100 may include other mobile device(s) 104a, . . . , 104m. Each of the other mobile device(s) 104a, . . . , 104m may include elements similar to those that are included in mobile devices 102A, 102B and are described herein. Further, each of the other mobile device(s) 104a, . . . , 104m may be configured to perform operations similar to mobile devices 102A, 102B. Thus, descriptions of mobile devices 102A, 102B apply to one or more other mobile device(s) 104a, . . . , 104m that may be participating in dynamic route mapping consistent with various embodiments of the present disclosure.

In the description below, mobile device 102A (first mobile device) and/or an element of mobile device 102A, e.g., communication module 112A, may be described as initiating communication, etc. with mobile device 102B (second mobile device). It should be noted that the descriptions are similarly applicable to mobile device 102B initiating communication, etc. with mobile device 102A. Mobile device 102A operating with respect to mobile device 102B reflects one example and is utilized for ease of description without loss of generality. Mobile device 102A may operate similarly with respect to one or more other mobile device(s) 104a, . . . , 104m and mobile device 102B may likewise operate similarly with respect to mobile device 102A and/or one or more other mobile device(s) 104a, . . . , 104m.

Network 106 is configured to couple mobile device 102A to mobile device 102B and may include wired and/or wireless networks, including, but not limited to Wi-Fi, the internet, and/or cellular telephone networks such as 2G, 3G and 4G.

Mobile devices 102A, 102B may include various hardware platforms that are capable of wired and/or wireless communication, including satellite, and may be capable of receiving a location signal and determining a device location based on the location signal. For example, mobile devices 102A, 102B may include, but are not limited to, any handheld computing device, including, but not limited to, mobile telephones, cellular telephones, feature phones, smart phones (e.g., iPhones®, Android®-based phones, Blackberries®, Symbian®-based phones, Palm®-based phones, etc.), tablet computers, notebook computers, ultra-portable computers, ultramobile computers, netbook computers, subnotebook computers, personal digital assistants, enterprise digital assistants, mobile internet devices and personal navigation devices.

Mobile devices 102A, 102B each includes one or more processor(s) 110A, 110B, communication module 112A, 112B, display 114A, 114B, location module 116A, 116B and mapping module 118A, 118B. Processor(s) 110A, 110B are configured to perform operations of one or more applications and/or modules as described herein. Communication module 112A is configured to couple mobile device 102A to mobile device 102B and/or network 106 and communication module 112B is configured to couple mobile device 102B to mobile device 102A and/or network 106. Communication modules 112A, 112B may be configured to communicate using one or more communication protocols, wired (e.g., Universal Serial Bus (USB), Ethernet, Firewire, etc.) and/or wireless including satellite (e.g., NFC, RFID, Wi-Fi, Bluetooth, 2G, 3G, 4G, etc.). Communication module 112A may be configured to establish communication with communication module 112B in response to a request for a user (User A) of mobile device 102A. The request may include entering a cellular telephone number corresponding to mobile device 102B (and User B) into mobile device 102A, selecting User B's name from a contact list stored in mobile device 102A, etc.

Displays 114A, 114B include any device configured to display text, maps, pop-ups, images, user interfaces, graphics, etc. Displays 114A, 114B may be integrated within respective mobile devices 102A, 102B or may interact with the mobile device via wired or wireless communication such as described in the above examples regarding communication modules 112A, 112B. In one embodiment, displays 114A, 114B are configured to display at least a portion of a mapped route and a location of at least one mobile device 102A, 102B.

The displays 114A, 114B may be touch-sensitive displays configured to receive user inputs. User inputs may include touch events (e.g., tap(s), tap and hold, pinch, swipe, etc.). The displays 114A, 114B may each be configured to display a keypad for entering a telephone number, e.g., associated with another mobile device, and/or a contact list for selecting a call recipient usable for establishing communication between, e.g., mobile device 102A and mobile device 102B. For example, the communication may be a voice communication between User A and User B, using mobile device 102A and mobile device 102B, respectively.

The displays 114A, 114B may each be configured to display a dynamic route mapping button. A user touch event, e.g., a tap on the dynamic route mapping button, is configured to initiate operation(s) corresponding to dynamic route mapping as described herein. A user may initiate the dynamic route mapping during communication (e.g., telephone call) between mobile devices 102A and 102B. Thus, in an embodiment consistent with the present disclosure, dynamic route mapping may be initiated via an in-call experience.

Location modules 116A, 116B are each configured to determine a location of a respective mobile device 102A, 102B based on one or more location signal(s). For example, a first mobile device, e.g., mobile device 102A, may be at a first location and a second mobile device, e.g., mobile device 102B, may be at a second location. In an embodiment, location modules 116A, 116B may each be configured to receive location signal(s) from signal source 108 and to determine the location of respective mobile device 102A, 102B based on the received location signal(s). For example, signal source 108 may include one or more components of the Global Positioning System (GPS). GPS is a satellite-based navigation system that transmits location signal(s) to earth. The location signal(s) and triangulation techniques may then be used to determine each device's location. In another embodiment, location modules 116A, 116B may each be configured to determine location based on a cellular-based data communication technologies, e.g., second generation (2G), third generation (3G), fourth generation (4G) cellular-based data communication technologies. In this embodiment, location modules 116A, 116B may each be configured to determine location based on relative signal strengths of a plurality of signals received from a plurality of cellular communication transmitters ("cell towers"). In another embodiment, location modules 116A, 116B may each be configured to determine location based on Wi-Fi wireless data communication technology. In this embodiment, location modules 116A, 116B may each be configured to determine location based on an address associated with a Wi-Fi access point.

Location module 116A is configured to provide a location indicator to the second mobile device 102B in response to a request from the second mobile device 102B during a communication established between the first mobile device 102A and the second mobile device 102B. The location indicator may correspond to the first location, i.e., the location of the first mobile device 102A determined, e.g., based on location signal(s) from location signal source 108. The location indicator may be provided to the second mobile device 102B if User A has opted in, allowing communication of the first location to the second mobile device 102B.

The opt in may have an associated duration. For example, the duration may correspond to a duration of the current communication, to a predefined time interval or may be indefinite, i.e., until User A revokes the opt in. Thus, each location module 116A, 116B is configured to determine the location of the respective mobile device 102A, 102B (first location and second location, respectively). Each location module 116A, 116B is further configured to request a location indicator from the other mobile device and/or to receive a requested location indicator from the other mobile device based at least in part on a user input.

Mapping modules 118A, 118B are each be configured to generate a respective travel route for a respective mobile device 102A, 102B based on the first location and the second location. Mapping modules 118A, 118B may generate the travel route(s) based on locally stored map data and/or may be configured to access a mapping service via, e.g., network 106, in order to generate the travel route. Mapping modules 118A, 118B each include custom, proprietary, known and/or after-developed mapping processing code (or instruction sets) that are generally well-defined and operable to generate travel routes based on a first location and a second location.

Each mapping module 118A, 118B may receive a first and/or second location indicator (corresponding to the first location and/or the second location) from the respective location module 116A, 116B. At least one mapping module 118A, 118B may then determine a convergence point based on at least one of the first location and the second location. In one embodiment, for the first mobile device 102A stationary, the first mobile device 102A may transmit its location (i.e., first location indicator) to the second mobile device 102B in response to a request from the second mobile device 102B. The second mapping module 118B may then map a route from the second location to the first location. The mapped route may then be displayed on display 114B. In this embodiment, the first module is stationary and the first location corresponds to the convergence point.

In another embodiment, both mobile devices 102A, 102B may be moving or may be configured to travel to the convergence point. In this embodiment, the mobile devices 102A, 102B may exchange respective location indicators. The first mapping module 118A and/or the second mapping module 118B may then determine a convergence point based on the first location and the second location. For example, the convergence point may be equally distant from the first location and the second location, e.g., along a travel route connecting the first location and the second location. In another example, each user may be queried for mode of travel and the respective modes of travel may be exchanged by the mobile devices 102A, 102B. Modes of travel may include driving/riding in an automobile, riding a bicycle, running, walking, etc. The mapping modules 118A, 118B may then consider the mode(s) of travel when determining the convergence point. For example, each mode of travel may have an associated estimated travel speed. The convergence point may then be determined based on estimated travel time. In this example, the convergence point may correspond to a location where an estimated travel time from the first location to the convergence point is equal to an estimated travel time from the second location to the convergence point.

If one mapping module 118A or 118B determines the convergence point, the location of the convergence point may be communicated to the other mobile device and its associated mapping module. Additionally or alternatively, both mapping modules 118A, 118B may be configured to determine a respective tentative convergence point. The tentative convergence points may be exchanged between the mobile devices 102A, 102B. If the tentative convergence points agree (i.e., are the same or approximately the same), then the convergence point may be set to the tentative convergence point. If the tentative convergence points are not the same, then one may be selected as the convergence point or a convergence point may be determined based on the tentative convergence points. For example, the determined convergence point may correspond to a location between the two tentative convergence points.

The mapping modules 118A, 118B may then map respective routes from the first location and the second location to the convergence point. At least a portion of the mapped route may then be displayed on displays 114A, 114B.

During travel along the mapped travel route, the first mobile device 102A and the second mobile device 102B may be configured to transmit a respective first current location and second current location to the other mobile device 102B, 102A. At least one mapping module 118A, 118B may then be configured to determine a new convergence point based on the first current location and the second current location. If the new convergence point differs by a threshold amount from the existing convergence point, then the convergence point may be set to the new convergence point and the mapping module 118A, 118B may be configured to adjust the mapped route based on the new convergence point. In this manner, variations in travel times of the mobile devices 102A, 102B and their respective users may be accommodated.

Thus, dynamic mapping system 100 is configured to map a route between the locations of at least two mobile devices when users of the mobile devices are communicating via the mobile devices. One or more of the users may then travel along the mapped route to a convergence point. The convergence point corresponds to a meeting point. The convergence point may correspond to a location of a stationary user and associated mobile device. If the users are moving, then the convergence point may be determined based on respective locations of the mobile devices. The convergence point may be updated during travel. The users may then meet at the updated convergence point.

Figure 2:
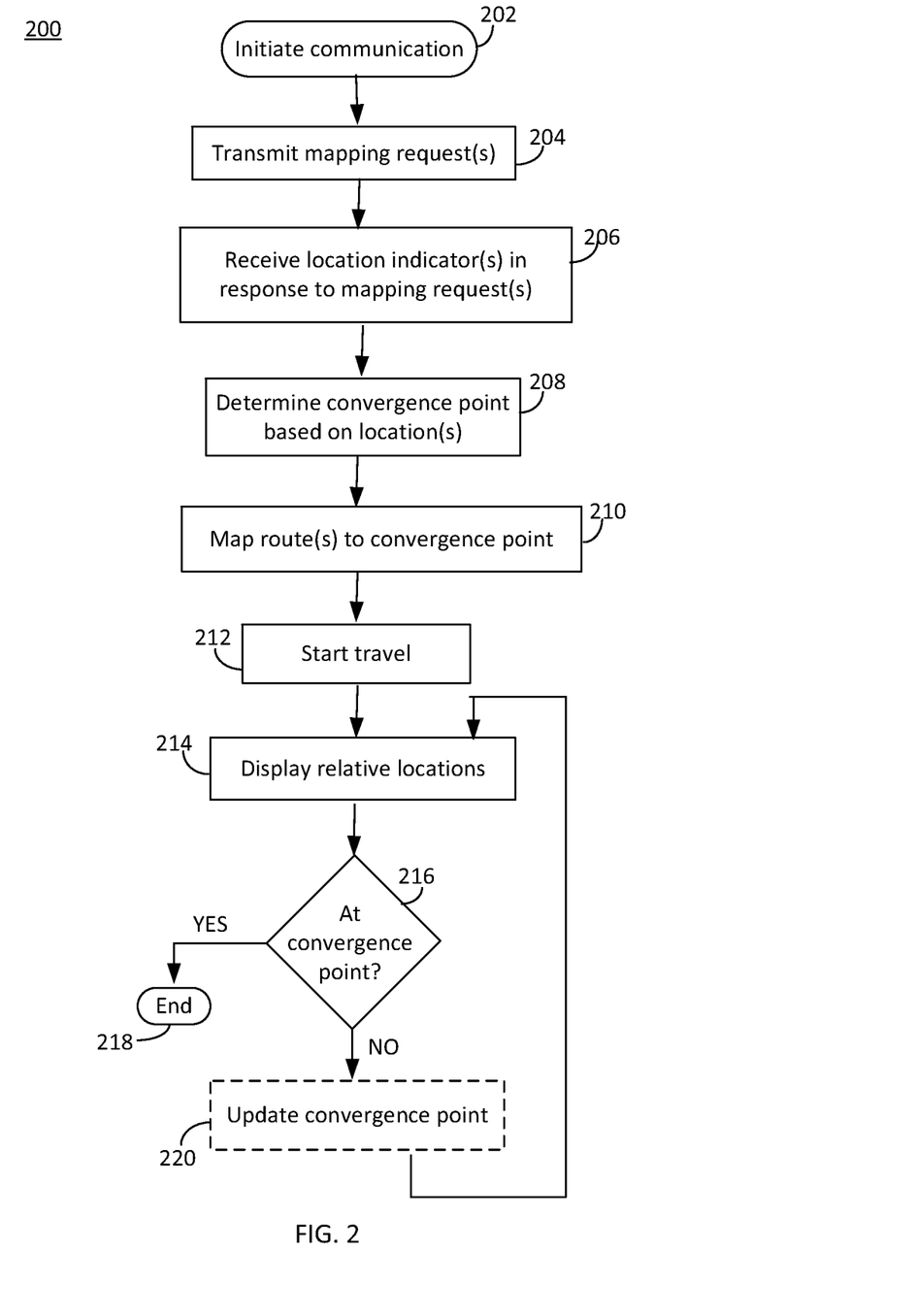
FIG. 2 illustrates a flowchart of exemplary operations consistent with various embodiments of the present disclosure.

FIG. 2 illustrates a flowchart 200 of exemplary operations consistent with an embodiment of the present disclosure. The operations may be performed, for example, by mobile device 102A and/or mobile device 102B. In particular, flowchart 200 depicts exemplary operations configured to provide dynamic route mapping between mobile devices.

The operations of flowchart 200 may begin with operation 202 initiating communication. For example, User A and associated first mobile device 102A located at a first location may initiate a voice communication with User B and associated second mobile device 102B located at a second location. One or more mapping request(s) may be transmitted at operation 204. For example, User B may initiate a mapping request by selecting dynamic route mapping via a touch event on the second mobile device 102B, as described herein. The second mobile device 102B may then be configured to transmit a mapping request to the first mobile device 102A. If both users will be traveling to a meeting location (i.e., convergence point) then a mapping request may be transmitted from the first mobile device 102A to the second mobile device 102B. A convergence point may then be determined based on the first location and/or the second location at operation 208. For example, the convergence point may correspond to first location if User A is at the meeting location. In another example, the convergence point may be on a travel route between the first location and the second location.

Operation 210 includes mapping route(s) to the convergence point. For example, if only one user, e.g., User B, (and associated mobile device, e.g., second mobile device 102B) will be traveling to the convergence point (i.e., User A and the first mobile device 102A may remain stationary at the first location), one map may be generated between the traveling User B's location (i.e., the location of the second mobile device 102B) and the convergence point. If both users will be traveling to the convergence point then a first route may be mapped from the first location to the convergence point and a second route may be mapped from the second location to the convergence point. Travel may then start at operation 212.

Relative user locations may be displayed at operation 214. The relative locations are configured to show each user a distance between that user and the other user. The relative locations may be determined based on each mobile device's current location (i.e., current first location and current second location). The relative location display may include the convergence point. Whether the user(s) and their respective mobile devices are at the convergence point may be determined at operation 216. If the users are at the convergence point, then program flow may end at operation 218. If the users are not at the convergence point, then the convergence point may be updated at operation 220. For example, the convergence point may be updated based on a current first location of User A and the first mobile device 102A and a current second location of User B and the second mobile device 102B. Program flow may then proceed to operation 214 displaying relative locations.

Thus, the operations of flowchart 200 are configured to dynamically map a route to a convergence (i.e., meeting) point for at least two users communicating via their respective mobile devices. The meeting point may be at a convergence point determined based on a first location corresponding to the location of the first mobile device 102A and a second location corresponding to the location of the second mobile device 102B. The convergence point may be updated based on a new first location and/or new second location as the users and their respective mobile devices travel to the convergence point.

Figure 3A:
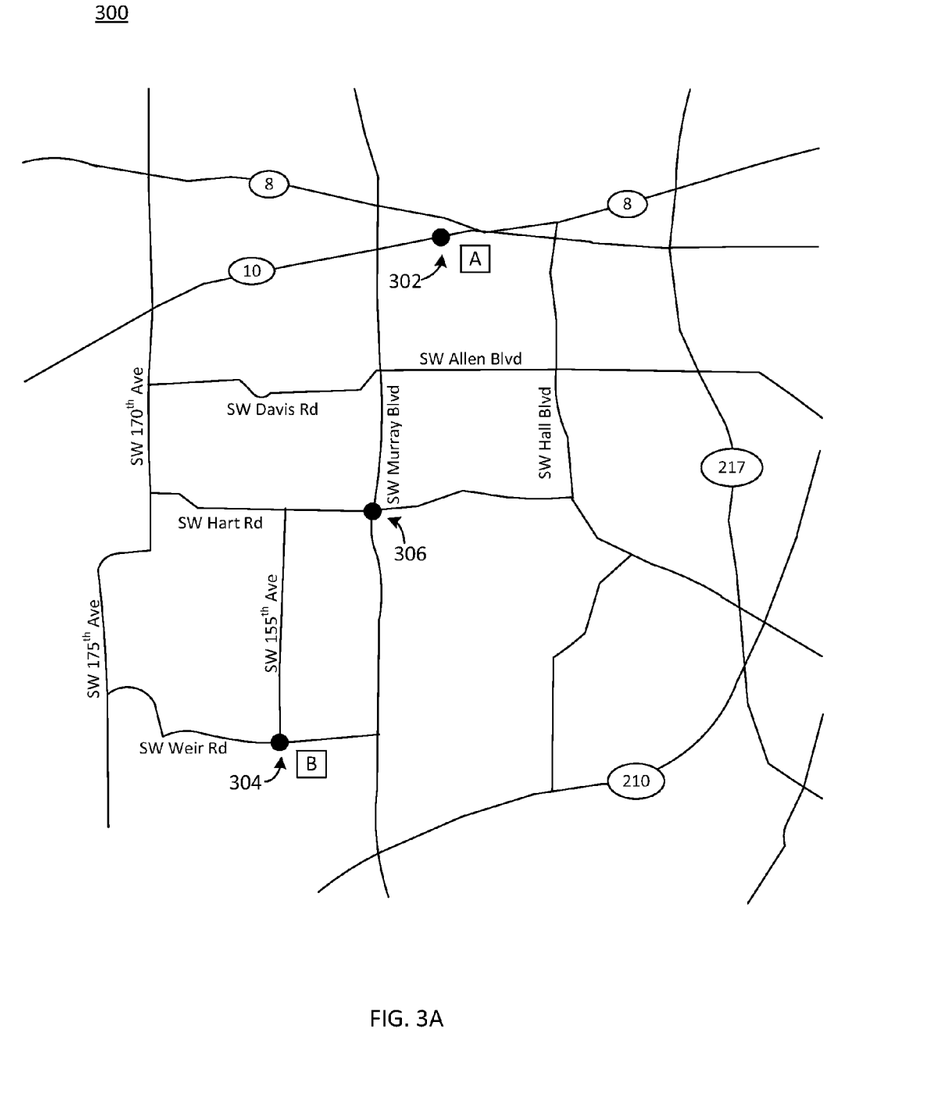
FIGS. 3A and 3B are maps illustrating an example of dynamic route mapping consistent with various embodiments of the present disclosure.
Figure 3B:
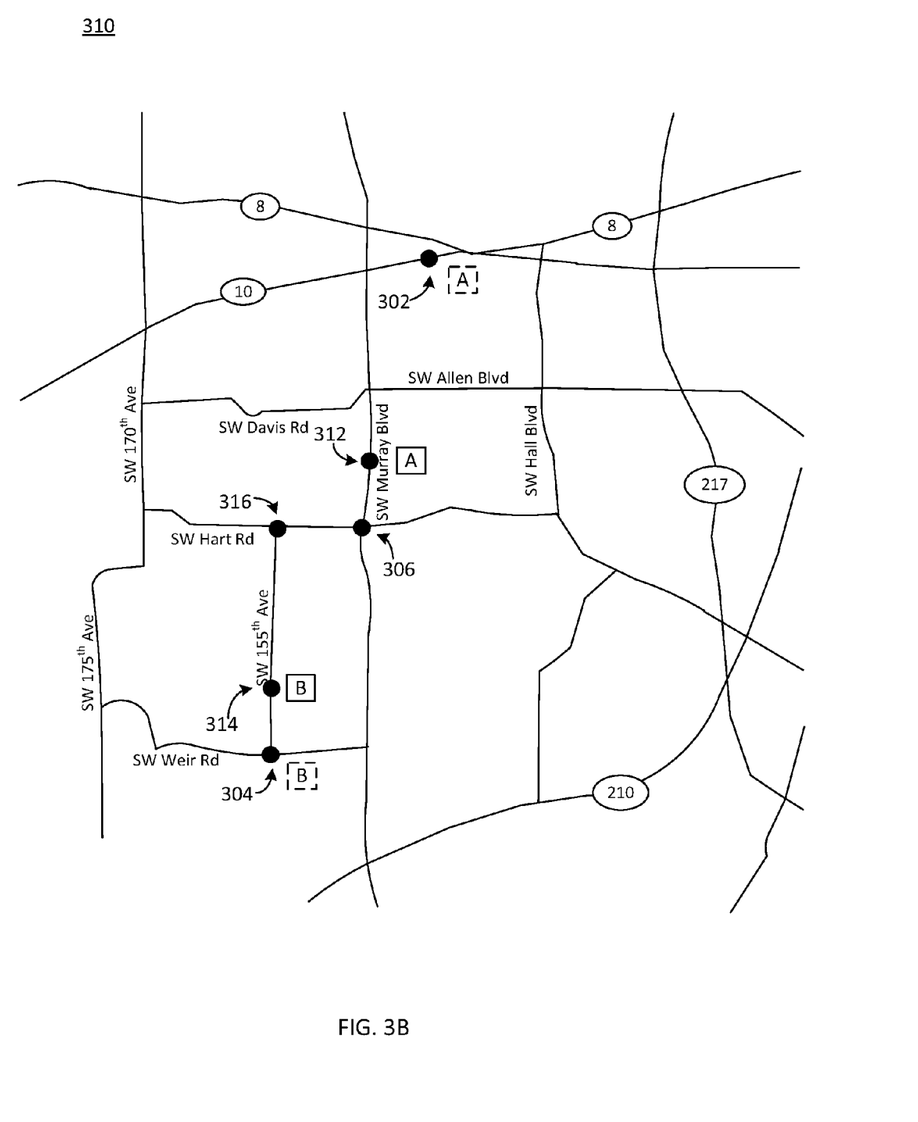

FIGS. 3A and 3B illustrate an example of dynamic route mapping consistent with various embodiments of the present disclosure. FIG. 3A illustrates a map 300 of a portion of Beaverton, Oreg., and the locations of a first user, User A, and User A's associated mobile device (e.g., first mobile device 102A) and a second user, User B, and User B's associated mobile device (e.g., second mobile device 102B). User A is at a first location, location 302, and is illustrated by box A and User B is at a second location, location 304, and is illustrated by box B. Thus, User A is on or near Route 10 near an intersection of Routes 10 and 8 (i.e., the first location). User B is at the intersection of SW Weir Road and SW 155$^{th}$ Avenue (i.e., the second location). In this example, User A and User B are engaged in a cellular telephone conversation using their respective mobile devices (i.e., the first mobile device 102A and the second mobile device 102B). User A and User B wish to meet and desire a meeting location but they are not familiar with Beaverton, Oreg. Dynamic routing consistent with the present disclosure is initiated and mapping requests are transmitted and both users opt in so their respective locations are communicated to the other mobile device, as described herein. A convergence point is determined based on the first location and the second location. The convergence point 306 is determined to be at the intersection of SW Murray Boulevard and SW Hart Road, approximately half way between User A's location 302 (i.e., the first location) and User B's location 304 (i.e., the second location). In this example, User A and User B are both traveling by automobile.

Map 310 of FIG. 3B illustrates the map 300 of FIG. 3A at a later time, while User A and User B are traveling toward convergence point 306. User B has been delayed by traffic so that User B's (and the second mobile device's) current location 314 is on SW 155$^{th}$ Avenue not far from User B's initial location, second location 304. User A has not been delayed so User A's current location 312 is on SW Murray Boulevard relatively near the initial convergence point 306. The convergence point is updated as described herein to an updated convergence point 316 at the intersection of SW 155$^{th}$ Avenue and SW Hart Road, approximately half way between User A's current location, current first location 312 and User B's current location, current second location 314.

Thus, FIGS. 3A and 3B illustrate an example of dynamic route mapping for two users engaged in a communication via their respective mobile devices who wish to meet. A dynamic route mapping system consistent with the present disclosure may be utilized to determine an initial convergence point (meeting location) based on a first location corresponding to the location of User A and a second location corresponding to the location of User B. The dynamic route mapping system may be utilized to update the convergence point during travel based on a new first location and a new second location. For example, the updated convergence point may reflect differences in travel times of the users.

While FIG. 2 illustrates various operations according one embodiment, it is to be understood that not all of the operations depicted in FIG. 2 are necessary for other embodiments. Indeed, it is fully contemplated herein that in other embodiments of the present disclosure, the operations depicted in FIG. 2 and/or other operations described herein may be combined in a manner not specifically shown in any of the drawings, but still fully consistent with the present disclosure. Thus, claims directed to features and/or operations that are not exactly shown in one drawing are deemed within the scope and content of the present disclosure.

As used in any embodiment herein, the term "app" may be embodied in code or instructions that may be executed on programmable circuitry such as a host processor or other programmable circuitry.

As used in any embodiment herein, the term "module" may refer to an app, software, firmware and/or circuitry configured to perform any of the aforementioned operations. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in memory devices.

"Circuitry", as used in any embodiment herein, may comprise, for example, singly or in any combination, hard-wired circuitry, programmable circuitry such as computer processors comprising one or more individual instruction processing cores, state machine circuitry, and/or firmware that stores instructions executed by programmable circuitry. The modules may, collectively or individually, be embodied as circuitry that forms part of a larger system, for example, an integrated circuit (IC), system on-chip (SoC), desktop computers, laptop computers, tablet computers, servers, smart phones, etc.

Any of the operations described herein may be implemented in a system that includes one or more storage mediums having stored thereon, individually or in combination, instructions that when executed by one or more processors perform the methods. Here, the processor may include, for example, a server CPU, a mobile device CPU, and/or other programmable circuitry. Also, it is intended that operations described herein may be distributed across a plurality of physical devices, such as processing structures at more than one different physical locations. The storage medium may include any type of tangible medium, for example, any type of disk including hard disks, floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, Solid State Disks (SSDs), magnetic or optical cards, or any type of media suitable for storing electronic instructions. Other embodiments may be implemented as software modules executed by a programmable control device. The storage medium may be non-transitory.

Mobile device 102A may be configured to communicate with network 106 and/or mobile device 102B using a variety of communication protocols. The communications protocols may include but are not limited to wireless communications protocols, such as NFC, RFID, Wi-Fi, Bluetooth, 3G, 4G and/or other communication protocols. The Wi-Fi protocol may comply or be compatible with the 802.11 standards published by the Institute of Electrical and Electronics Engineers (IEEE), titled "IEEE 802.11-2007 Standard, IEEE Standard for Information Technology-Telecommunications and Information Exchange Between Systems-Local and Metropolitan Area Networks-Specific Requirements—Part 11: Wireless LAN Medium Access Control (MAC) and Physical Layer (PHY) Specifications" published, Mar. 8, 2007, and/or later versions of this standard.

The NFC and/or RFID communication signal and/or protocol may comply or be compatible with one or more NFC and/or RFID standards published by the International Standards Organization (ISO) and/or the International Electrotechnical Commission (IEC), including ISO/IEC 14443, titled: Identification cards—Contactless integrated circuit cards—Proximity cards, published in 2008; ISO/IEC 15693: Identification cards—Contactless integrated circuit cards—Vicinity cards, published in 2006, titled: ISO/IEC 18000, titled: Information technology—Radio frequency identification for item management, published in 2008; and/or ISO/IEC 18092, titled: Information technology—Telecommunications and information exchange between systems—Near Field Communication—Interface and Protocol, published in 2004; and/or later versions of these standards.

The Bluetooth protocol may comply or be compatible with the 802.15.1 standard published by the IEEE, titled "IEEE 802.15.1-2005 standard, IEEE Standard for Information technology—Telecommunications and information exchange between systems—Local and metropolitan area networks—Specific requirements Part 15.1: Wireless Medium Access Control (MAC) and Physical Layer (PHY) Specifications for Wireless Personal Area Networks (W Pans)", published in 2005, and/or later versions of this standard.

The 3G protocol may comply or be compatible with the International Mobile Telecommunications (IMT) standard published by the International Telecommunication Union (ITU), titled "IMT-2000", published in 2000, and/or later versions of this standard. The 4G protocol may comply or be compatible with IMT standard published by the ITU, titled "IMT-Advanced", published in 2008, and/or later versions of this standard.

For example, network 106 may comprise a packet switched network. Mobile device 102A may be capable of communicating with the mobile device 102B using a selected packet switched network communications protocol. One exemplary communications protocol may include an Ethernet communications protocol which may be capable permitting communication using a Transmission Control Protocol/Internet Protocol (TCP/IP). The Ethernet protocol may comply or be compatible with the Ethernet standard published by the Institute of Electrical and Electronics Engineers (IEEE) titled "IEEE 802.3 Standard", published in March, 2002 and/or later versions of this standard. Alternatively or additionally, mobile device 102A may be capable of communicating with the mobile device 102B, using an X.25 communications protocol. The X.25 communications protocol may comply or be compatible with a standard promulgated by the International Telecommunication Union-Telecommunication Standardization Sector (ITU-T). Alternatively or additionally, mobile device 102A may be capable of communicating with the mobile device 102B, using a frame relay communications protocol. The frame relay communications protocol may comply or be compatible with a standard promulgated by Consultative Committee for International Telegraph and Telephone (CCITT) and/or the American National Standards Institute (ANSI). Alternatively or additionally, mobile device 102A may be capable of communicating with the mobile device 102B, using an Asynchronous Transfer Mode (ATM) communications protocol. The ATM communications protocol may comply or be compatible with an ATM standard published by the ATM Forum titled "ATM-MPLS Network Interworking 1.0" published August 2001, and/or later versions of this standard. Of course, different and/or after-developed connection-oriented network communication protocols are equally contemplated herein.

Thus, a system and method consistent with at least one embodiment of the present disclosure are configured to allow two (or more) users who are communicating using mobile devices to map a route to a meeting location (i.e., convergence point). One or both of the users may travel to the convergence point and the convergence point may be updated during travel based their current locations. The system and method may allow the users to determine a meeting point using their mobile devices whether or not they are familiar with the area.

According to one aspect there is provided a system. The system may include a first mobile device at a first location and a second mobile device at a second location. The first mobile device of this example may comprise a first communication module, a first location module, a first mapping module and a first display. The second mobile device of this example may comprise a second communication module, a second location module, a second mapping module and a second display. The second communication module of this example is configured to initiate communication between the first mobile device and the second mobile device. The second location module of this example is configured to receive a first location indicator transmitted from the first mobile device in response to a request from the second mobile device. The first location indicator of this example may correspond to the first location. At least one of the first mapping module and the second mapping module of this example is configured to determine a convergence point based on at least one of the first location and the second location and to map a travel route from at least one of the first location and the second location to the convergence point. At least one of the first display and the second display of this example is configured to display the travel route.

Another example system includes the forgoing components and the first mobile device is configured to receive a second location indicator transmitted from the second mobile device in response to a request from the first mobile device. The second location indicator of this example corresponds to the second location. The convergence point of this example is determined based on the first location and the second location.

Another example system includes the forgoing components and at least one of the first mapping module and the second mapping module is configured to update the convergence point based on at least one of a current first location and a current second location when the first mobile device is at the current first location and the second mobile device is at the current second location.

Another example system includes the forgoing components and at least one of the first display and the second display is configured to display a relative location of the first mobile device and the second mobile device.

Another example system includes the forgoing components and the first mobile device is configured to opt in to transmitting the first location indicator.

Another example system includes the forgoing components and the convergence point is a first distance from the first location and a second distance from the second location. The first distance and second distance of this example are less than a distance between the first location and the second location along the travel route.

Another example system includes the forgoing components and the convergence point is halfway between the first location and the second location along the travel route.

According to another aspect there is provided a method. The method may include initiating communication between a first mobile device at a first location and a second mobile device at a second location. The method of this example may also include receiving a first location indicator by the second mobile device. The first location indicator of this example may be transmitted from the first mobile device in response to a request from the second mobile device. The first location indicator of this example corresponds to the first location. The method of this example may also include determining a convergence point based on at least one of the first location and the second location. The method of this example may further include mapping a travel route from at least one of the first location and the second location to the convergence point and displaying the travel route on at least one of the first mobile device and the second mobile device.

Another example method includes the forgoing operations and further includes receiving a second location indicator by the first mobile device. The second location indicator of this example may be transmitted from the second mobile device in response to a request from the first mobile device. The second location indicator corresponds to the second location. The convergence point of this example may be determined based on the first location and the second location.

Another example method includes the forgoing operations and further includes updating the convergence point based on at least one of a current first location and a current second location when the first mobile device is at the current first location and the second mobile device is at the current second location.

Another example method includes the forgoing operations and further includes displaying a relative location of the first mobile device and the second mobile device on at least one of the mobile devices.

Another example method includes the forgoing operations and further includes opting in to transmitting the first location indicator.

Another example method includes the forgoing operations and further includes that the convergence point is a first distance from the first location and a second distance from the second location and the first distance and second distance are less than a distance between the first location and the second location along the travel route.

Another example method includes the forgoing operations and further includes that the convergence point is halfway between the first location and the second location along the travel route.

According to another aspect there is provided a system. The system may include one or more storage mediums having stored thereon, individually or in combination, instructions that when executed by one or more processors result in the following operations comprising: initiating communication between a first mobile device at a first location and a second mobile device at a second location. The operations of this example may also include receiving a first location indicator by the second mobile device. The first location indicator of this example may be transmitted from the first mobile device in response to a request from the second mobile device. The first location indicator of this example corresponds to the first location. The operations of this example may further include determining a convergence point based on at least one of the first location and the second location. The operations of this example may also include mapping a travel route from at least one of the first location and the second location to the convergence point and displaying the travel route on at least one of the first mobile device and the second mobile device.

Another example system includes instructions that when executed by one or more processors result in the forgoing operations and also includes the following additional operation: receiving a second location indicator by the first mobile device. The second location indicator of this example may be transmitted from the second mobile device in response to a request from the first mobile device. The second location indicator of this example corresponds to the second location. The convergence point of this example is determined based on the first location and the second location.

Another example system includes instructions that when executed by one or more processors result in the forgoing operations and also includes the following additional operation: updating the convergence point based on at least one of a current first location and a current second location when the first mobile device is at the current first location and the second mobile device is at the current second location.

Another example system includes instructions that when executed by one or more processors result in the forgoing operations and also includes the following additional operation: displaying a relative location of the first mobile device and the second mobile device on at least one of the mobile devices.

Another example system includes instructions that when executed by one or more processors result in the forgoing operations and also includes the following additional operation: opting in to transmitting the first location indicator.

Another example system includes instructions that when executed by one or more processors result in the forgoing operations and also includes that the convergence point is a first distance from the first location and a second distance from the second location. The first distance and second distance of this example are less than a distance between the first location and the second location along the travel route.

Another example system includes instructions that when executed by one or more processors result in the forgoing operations and also includes that the convergence point is halfway between the first location and the second location along the travel route.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

What is claimed is:

1. A system comprising:
   a first mobile device at a first location, the first mobile device comprising a first communication module, a first location module, a first mapping module and a first display; and
   a second mobile device at a second location, the second mobile device comprising a second communication module, a second location module, a second mapping module and a second display,
   the second communication module configured to initiate communication between the first mobile device and the second mobile device,
   the second location module configured to receive a first location indicator transmitted from the first mobile device in response to a request from the second mobile device, the first location indicator corresponding to the first location,
   at least one of the first mapping module and the second mapping module configured to determine a first convergence point based on at least one of the first location and the second location and to map a travel route from at least one of the first location and the second location to the first convergence point, the first convergence point being a first target meeting location for a first user of the first mobile device and a second user of the second mobile device, and
   at least one of the first display and the second display configured to display the travel route;
   wherein:
      at least one of the first mapping module and the second mapping module is configured to determine a second convergence point based on at least one of a current first location and a current second location when the first mobile device is at the current first location and the second mobile device is at the current second location and, when the second convergence point is greater than a threshold distance from the first convergence point, to map a travel route from at least one of the current first location and the current second location to the second convergence point;
      the current first location is different from the first location;
      the current second location is different from the second location; and
      the second convergence point is a second target meeting location for the first user and the second user, and differs from the first convergence point.

2. The system of claim 1, wherein the first mobile device is configured to receive a second location indicator transmitted from the second mobile device in response to a request from the first mobile device, the second location indicator corresponding to the second location, and the first convergence point is determined based on the first location and the second location.

3. The system of claim 1, wherein at least one of the first display and the second display is configured to display a relative location of the first mobile device and the second mobile device.

4. The system of claim 1, wherein the first mobile device is configured to opt in to transmitting the first location indicator.

5. The system of claim 1, wherein the first convergence point is a first distance from the first location and a second distance from the second location and the first distance and second distance are less than a distance between the first location and the second location along the travel route.

6. The system of claim 1, wherein the first convergence point is halfway between the first location and the second location along the travel route.

7. A method comprising:
   initiating communication between a first mobile device at a first location and a second mobile device at a second location;
   receiving a first location indicator by the second mobile device, the first location indicator transmitted from the first mobile device in response to a request from the second mobile device, the first location indicator corresponding to the first location;
   determining a first convergence point based on at least one of the first location and the second location, the first convergence point being a first target meeting location for a first user of the first mobile device and a second user of the second mobile device;
   mapping a first travel route from at least one of the first location and the second location to the first convergence point;
   displaying the first travel route on at least one of the first mobile device and the second mobile device;
   determining a second convergence point based on at least one of a current first location and a current second location when the first mobile device is at the current first location and the second mobile device is at the current second location, the current first location being different from the first location and the current second location being different from the second location; and
   when the second convergence point is greater than a threshold distance from the first convergence point, mapping a second travel route to the second convergence point;
   wherein:
      the second convergence point is a second target meeting location for the first user and the second user, and differs from the first convergence point.

8. The method of claim 7, further comprising:
   receiving a second location indicator by the first mobile device, the second location indicator transmitted from the second mobile device in response to a request from the first mobile device, the second location indicator corresponding to the second location, wherein the first convergence point is determined based on the first location and the second location.

9. The method of claim 7, further comprising:
   displaying a relative location of the first mobile device and the second mobile device on at least one of the mobile devices.

10. The method of claim 7, further comprising:
    opting in to transmitting the first location indicator.

11. The method of claim 7, wherein the first convergence point is a first distance from the first location and a second distance from the second location and the first distance and second distance are less than a distance between the first location and the second location along the travel route.

12. The method of claim 7, wherein the first convergence point is halfway between the first location and the second location along the travel route.

13. A system comprising one or more non-transitory storage mediums having stored thereon, individually or in combination, instructions that when executed by one or more processors result in the following operations comprising:
  initiating communication between a first mobile device at a first location and a second mobile device at a second location;
  receiving a first location indicator by the second mobile device, the first location indicator transmitted from the first mobile device in response to a request from the second mobile device, the first location indicator corresponding to the first location;
  determining a first convergence point based on at least one of the first location and the second location, the first convergence point being a first target meeting location for a first user of the first mobile device and a second user of the second mobile device;
  mapping a first travel route from at least one of the first location and the second location to the first convergence point;
  displaying the first travel route on at least one of the first mobile device and the second mobile device;
  determining a second convergence point based on at least one of a current first location and a current second location when the first mobile device is at the current first location and the second mobile device is at the current second location, the current first location being different from the first location and the current second location being different from the second location; and
  when the second convergence point is greater than a threshold distance from the first convergence point, mapping a second travel route to the second convergence point;
  wherein:
    the second convergence point is a second target meeting location for the first user and the second user, and differs from the first convergence point.

14. The system of claim 13, wherein the instructions that when executed by one or more processors results in the following additional operations:
  receiving a second location indicator by the first mobile device, the second location indicator transmitted from the second mobile device in response to a request from the first mobile device, the second location indicator corresponding to the second location, wherein the first convergence point is determined based on the first location and the second location.

15. The system of claim 13, wherein the instructions that when executed by one or more processors results in the following additional operations:
  displaying a relative location of the first mobile device and the second mobile device on at least one of the mobile devices.

16. The system of claim 13, wherein the instructions that when executed by one or more processors results in the following additional operations:
  opting in to transmitting the first location indicator.

17. The system of claim 13, wherein the first convergence point is a first distance from the first location and a second distance from the second location and the first distance and second distance are less than a distance between the first location and the second location along the travel route.

18. The system of claim 13, wherein the first convergence point is halfway between the first location and the second location along the travel route.

* * * * *